United States Patent [19]

Helstrom

[11] Patent Number: 5,362,379
[45] Date of Patent: * Nov. 8, 1994

[54] OPEN-BOTTOMED CYCLONE WITH GAS INLET TUBE AND METHOD

[75] Inventor: John J. Helstrom, Naperville, Ill.

[73] Assignee: Amoco Corporation, Chicago, Ill.

[*] Notice: The portion of the term of this patent subsequent to Jan. 18, 2011 has been disclaimed.

[21] Appl. No.: 815,281

[22] Filed: Dec. 27, 1991

[51] Int. Cl.$^5$ .............................................. C10G 11/00
[52] U.S. Cl. .................................... 208/161; 208/113; 208/153; 422/147
[58] Field of Search ....................... 208/161, 153, 113; 422/147

[56] References Cited

U.S. PATENT DOCUMENTS

| | | | |
|---|---|---|---|
| 2,687,780 | 8/1954 | Culhane | 183/22 |
| 2,888,096 | 5/1959 | Evans | 208/153 |
| 3,448,563 | 6/1969 | Sobeck | 55/347 |
| 4,350,510 | 9/1982 | Hamada et al. | 55/349 |
| 4,397,738 | 8/1983 | Kemp | 208/161 |
| 4,455,220 | 6/1984 | Parker et al. | 208/161 |
| 4,478,708 | 10/1984 | Farnsworth | 208/161 |
| 4,482,451 | 11/1984 | Kemp | 208/153 |
| 4,692,235 | 9/1987 | Parker et al. | 208/153 |
| 4,891,129 | 1/1990 | Barnes | 208/161 |
| 4,904,281 | 2/1990 | Raterman | 55/1 |
| 5,112,576 | 5/1992 | Kruse | 208/161 |

*Primary Examiner*—Helane Myers
*Attorney, Agent, or Firm*—Scott P. McDonald; Richard A. Kretchmer

[57] ABSTRACT

An open-bottomed cyclone separator with gas inlet tube is disclosed which minimizes the entrainment of separated solids in a process gas entering the separator. In some embodiments, the gas inlet tube directs the process gas into a solids-depleted region within a cyclonic separation chamber. In other embodiments, a gas inlet tube directs the process gas into a stream of solids-depleted gas withdrawn from the chamber. Methods for practicing the invention are also disclosed.

15 Claims, 3 Drawing Sheets

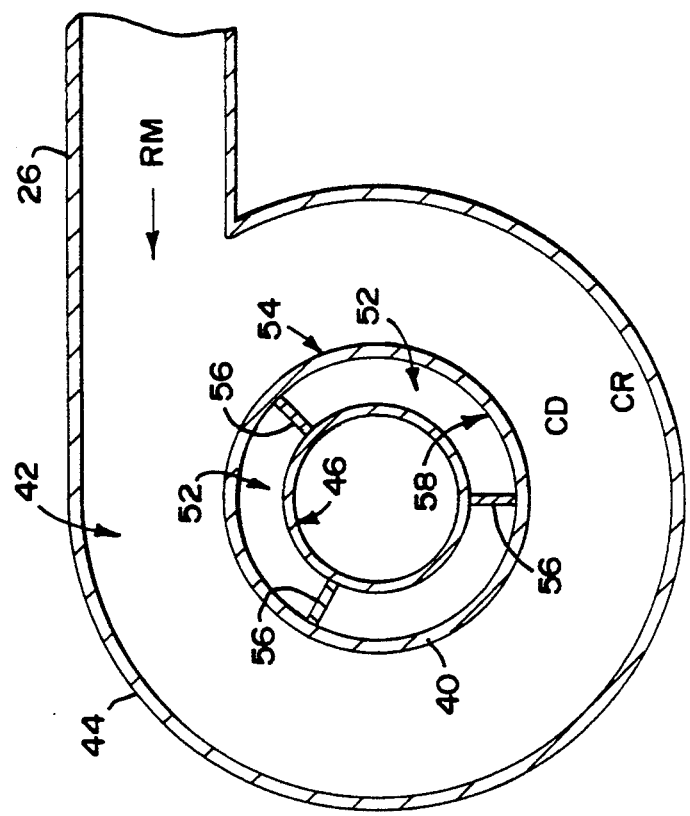
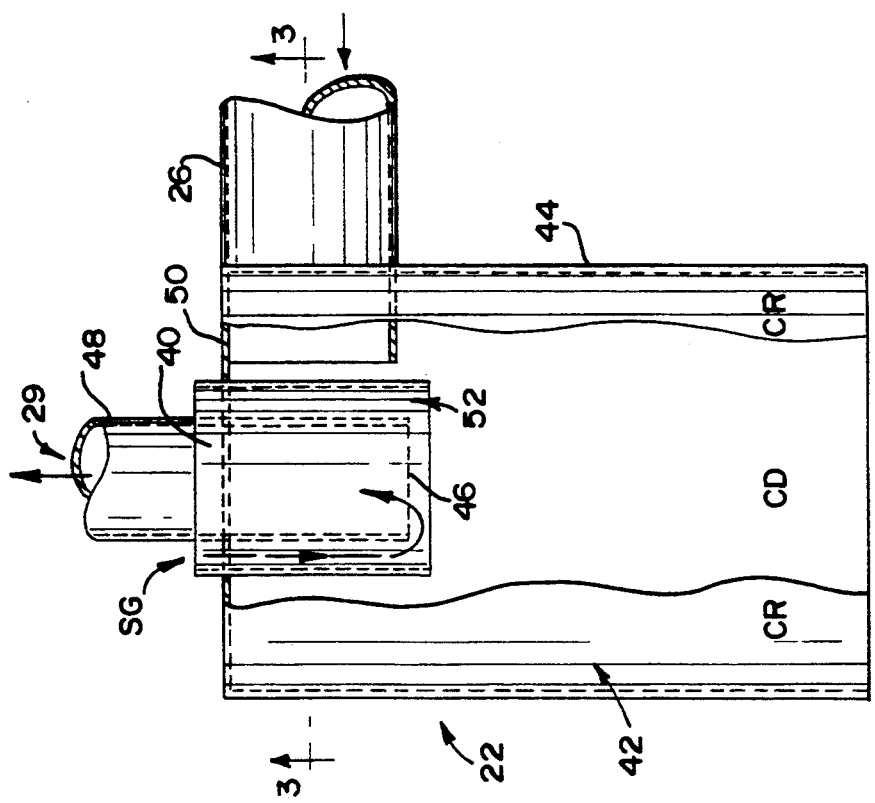

OPEN-BOTTOMED CYCLONE WITH GAS INLET TUBE AND METHOD

The subject matter of this application is related to the subject matter contained in an application entitled "Open-Bottomed Cyclone With Solids Separation Tube and Method", U.S. Ser. No. 07/815,286, also filed on Dec. 27, 1991, now U.S. Pat. No. 5,279,727.

FIELD OF THE INVENTION

The invention relates to methods and apparatus useful for separating solids from a mixture of gases and solids. More particularly, the invention relates to open-bottomed cyclone separators employing gas inlet tubes to direct process gas entering the separator away from a solids-rich region in the separator.

BACKGROUND OF THE INVENTION

Efficient use of petroleum feedstock typically requires a refiner to convert relatively high molecular weight hydrocarbons to more valuable lower molecular weight hydrocarbon materials. Catalytic cracking is one process used to produce the more valuable lower molecular weight materials.

Modern catalytic cracking processes typically react hydrocarbon vapors with a hot zeolitic cracking catalyst in a fluidized riser reactor. The cracking reaction proceeds as the catalyst and feedstock rise through the reactor, with a reaction mixture of predominantly spent catalyst and lower molecular weight hydrocarbons being discharged from the upper end of the reactor. After rising through the reactor, spent catalyst must be separated from the reaction mixture so that the cracked hydrocarbon products can be further processed and so that spent catalyst can be regenerated and reused.

In older "open" style catalyst disengagement systems, an initial solids separation typically is accomplished by causing a radical change in direction of reaction mixture flow. In such a system, the linear momentum of the catalyst particles forces the particles to impact on a surface near the point of flow redirection, thereby causing the particles to lose their momentum and fall from the mixture. At the same time, the relatively momentumless hydrocarbon vapors successfully negotiate the change in flow path direction and proceed through the system for further solids separation.

In these "open" systems, the solids-depleted gases are released into a large disengagement vessel which surrounds the riser reactor and contains one or more closed-bottomed cyclone separators, or "cyclones". The cyclones withdraw vapors from the vessel volume and cyclonically separate solids not removed in the initial disengagement step. After separating most of the solids from the withdrawn gas, the cyclones discharge a further solids-depleted gas along a closed path leading out of the vessel.

At the same time that solids-depleted gas is discharged into the vessel, spent catalyst separated in the initial disengagement step accumulates in the bottom portion of the vessel as a dense bed of catalyst. The bed is stripped of entrained hydrocarbon vapors by passing stripping steam through it, thereby releasing a mixture of stripped vapors and stripping steam, or "stripping gas", into the vessel volume located above the dense bed. The stripping gas entering the vessel volume is drawn into the cyclones along with the solids-depleted gas from the initial separation step.

The "open" style system just described provides the additional advantage of damping pressure and catalyst surges known to occur in catalytic cracking riser reactors. Causes of these surges include equipment malfunctions and the sudden vaporization of water present in feedstock, as well as various unit pressure upsets. Because these riser surges are damped into the large vessel volume before the reaction products enter the secondary separation equipment, the surges do not degrade the separation efficiency of downstream devices as they otherwise would if not damped into the vessel volume. Examples of such "open" systems can be found in U.S. Pat. No. 4,500,423.

Unfortunately, the older "open" style system has been found to contribute to the undesired secondary thermal cracking of gasoline range materials when operated in the 1000 degree plus Fahrenheit temperature range common in modern catalytic cracking units. Because the cracked products mix with the large vessel volume before being withdrawn from the vessel by the secondary separation equipment, the cracked products can reside in the vessel long enough at high enough temperatures to significantly affect product yield. For example, estimates show that as much as ten percent of the desired gasoline range products can be lost if these products are exposed to temperatures of 1100° F. for as little as 4 to 5 seconds.

To prevent undesired secondary thermal cracking, some refiners have turned to "closed" systems in which reaction products pass along a closed vapor path from a riser reactor to subsequent catalyst disengagement steps. By moving cracked vapors along a closed vapor path, the increases in gas residence time caused by mixing cracked products into a large disengagement vessel volume is avoided.

While closed systems succeed in minimizing gas residence times and the associated undesired thermal cracking of reaction products, closed systems can suffer from an inability to mitigate the effects of pressure and catalyst surges. Specifically, because surges no longer vent into a large disengagement vessel volume, surges typically propagate into the cyclone, disturbing the cyclonic motion of materials inside the cyclone. This in turn reduces the cyclone's separation efficiency.

One method of dealing with unwanted surges in closed systems is to employ a mechanical solution such as the surge activated trickle valves disclosed in U.S. Pat. No. 4,581,205. This method permits surges to be vented into a large vessel volume, but is undesirable because it increases the mechanical complexity of the separation equipment and because it requires the continued operation of mechanical devices in the thermally severe and erosive catalytic cracking environment.

A more desirable solution to surge and secondary cracking problems is to employ an "open-bottomed" cyclone design as disclosed by Farnsworth in U.S. Pat. No. 4,478,708, the disclosure of which is hereby incorporated by reference. In this design, catalytically-cracked products and spent catalyst follow a closed vapor path into a cyclone having a bottom which opens into a relatively large disengagement vessel volume. Catalyst is cyclonically separated in the cyclone in much the same manner as in other closed cyclones well known in the art, but instead of falling into a dipleg, separated catalyst simply falls through the open cyclone bottom into the lower portion of the disengagement vessel for stripping and collection. Catalyst-depleted gas is withdrawn from the top of the cyclone and is passed through secondary separation cyclones as in many traditional closed-bottomed cyclone systems.

Farnsworth's design apparently succeeds because the lower pressure upstream of his open-bottomed cyclone causes the cyclone to appear to be a closed vapor path for gases even though the bottom of the cyclone is open. Only when cyclone inlet pressure increases significantly, such as under surge conditions, does the open bottom offer a vapor path into the large disengagement volume. Thus, Farnsworth's design represents an apparent improvement over the other designs already discussed.

While Farnsworth's open-bottomed cyclone design provides a partial solution to the surge and thermal cracking problems inherent in closed-vapor path catalytic cracking operations, his design suffers from a serious disadvantage that stems from the use of the open-bottomed cyclone. Specifically, while separated catalyst is falling downwardly toward the open cyclone bottom, stripping gas simultaneously must flow up into the open bottom. The countercurrent flow of catalyst and vessel vapors can cause separated catalyst exiting the chamber to become entrained in the stripping gas entering the cyclone, thereby reducing the efficiency of the separator.

Until now, those skilled in the art have not recognized the problem of open-bottomed cyclone reentrainment. Instead, work to improve cyclone separators primarily has been directed toward improvements in the more traditional "closed-bottomed" cyclone designs. For example, Baillie, U.S. Pat. No. 4,081,249 teaches that closed-bottomed cyclone catalyst attrition can be reduced through the use of a collection of arresting vanes, flow reversing plates and baffles within the cyclone.

Other work by Baillie disclosed in U.S. Pat. No. 4,486,207 teaches that particle attrition can be reduced through the use of multiple cyclone inlets. The use of these multiple inlets permits increased cyclone throughput without increasing tangential wall velocity.

Parker, U.S. Pat. No. 4,455,220 discloses a combined cyclonic separation and stripping system in which a cyclonic separator is located directly over a stripping section and within a single closed vertical conduit. Parker employs a vortex stabilizer between the cyclonic and stripping sections to improve cyclone performance. It should be noted that Parker's design forces catalyst and stripped vapors to travel in a countercurrent manner between the stabilizer and the inner conduit wall housing the stabilizer, thereby also permitting entrainment of downwardly moving solids in the vapors moving upwardly from the stripping zone.

Kruse, U.S. Ser. No. 07/529,204 now U.S. Pat. No. 5,171,423, also teaches the use of a cyclone separator located directly above a stripping zone within a single closed vertical conduit. Unlike Parker, Kruse employs a cone having an aperture in its center to direct stripping gases along the longitudinal axis of his conduit. As with Parker, Kruse's invention essentially is a closed cyclone design intended for use outside of a disengagement vessel, and appears to have a region of countercurrently moving catalyst and stripping gas near the conduit wall.

None of the cyclone designs discussed above provide for a mechanically simple cyclone design which can accommodate pressure and catalyst surges while at the same time minimizing entrainment of separated catalyst in a stripping gas flowing into the cyclone open bottom.

SUMMARY OF THE INVENTION

It is an object of the invention to provide an improved cyclone design for separating spent catalyst from catalytic cracking products.

It is another object of the invention to provide a cyclone design which provides an effectively closed vapor path between a riser reactor and another downstream component such as a secondary cyclone.

It is a further object of the invention to provide a cyclone separator which can accommodate pressure and catalyst surges.

It is yet another object of the invention to provide a cyclone separator which can receive stripping gas while minimizing re-entrainment of separated catalyst in the stripping gas.

It is still another object of the invention to provide an improved open-bottomed cyclone of mechanically simple design.

Other objects of the invention will become apparent as discussed hereafter.

The aforestated objects of the invention can be accomplished by providing a cyclone separator having a gas inlet tube for directing a process gas into a region of solids-depleted gas within the separator. The separator includes a separation chamber having an open first end, a radially symmetric wall chamber extending from the first end to a second chamber end, and a chamber end member for closing the second end of the chamber; gas withdrawal structure for withdrawing a solids-depleted gas from a solids-depleted central region of the chamber; cyclonic flow generating structure for creating a cyclonic flow of mixture within the chamber, thereby causing cyclonically rotating solids to separate from the mixture and rotate outwardly in a solids-rich region near the chamber wall member and out the open chamber end; and gas inlet tube structure for mixing a process gas present outside the chamber with the solids-depleted gas by directing process gas through the inlet tube structure towards a region of solids-depleted gas within the separator.

The gas inlet tube structure provided limits reentrainment of a solid such as a catalytic cracking catalyst by directing an entering process gas such as stripping gas away from solids-rich areas within the separator. In some embodiments, the flow directing structure directs stripping gas into a solids-depleted region within the chamber, while in other embodiments the gas inlet tube directs stripping gas into a region of solids-depleted gas present in a separator finder tube.

BRIEF DESCRIPTION OF THE DRAWINGS

FIG. 2 is an elevational view of the open-bottomed cyclone shown in FIG. 1.

FIG. 3 is a cross-sectional view of the cyclone of FIG. 2 taken along line 3—3 of FIG. 2.

DETAILED DESCRIPTION OF THE INVENTION

FIGS. 1-5 illustrate various embodiments of an open-bottomed cyclones in accordance with the present invention. In each FIGURE, like numbers refer to like parts. Each embodiment includes structure useful for directing stripping gas into an open-bottomed cyclone separator so as to minimize entrainment of cyclonically separated solid catalyst particles in the entering stripping gas. While FIGS. 1–5 illustrate several structures particularly useful for catalyst disengagement in catalytic cracking operations, it should be understood that the invention is not limited to these particular embodiments or specifically to catalytic cracking operations, as the invention can be used wherever the entrainment of cyclonically separated solids into a flow of a process gas is to be minimized.

Figure 1:
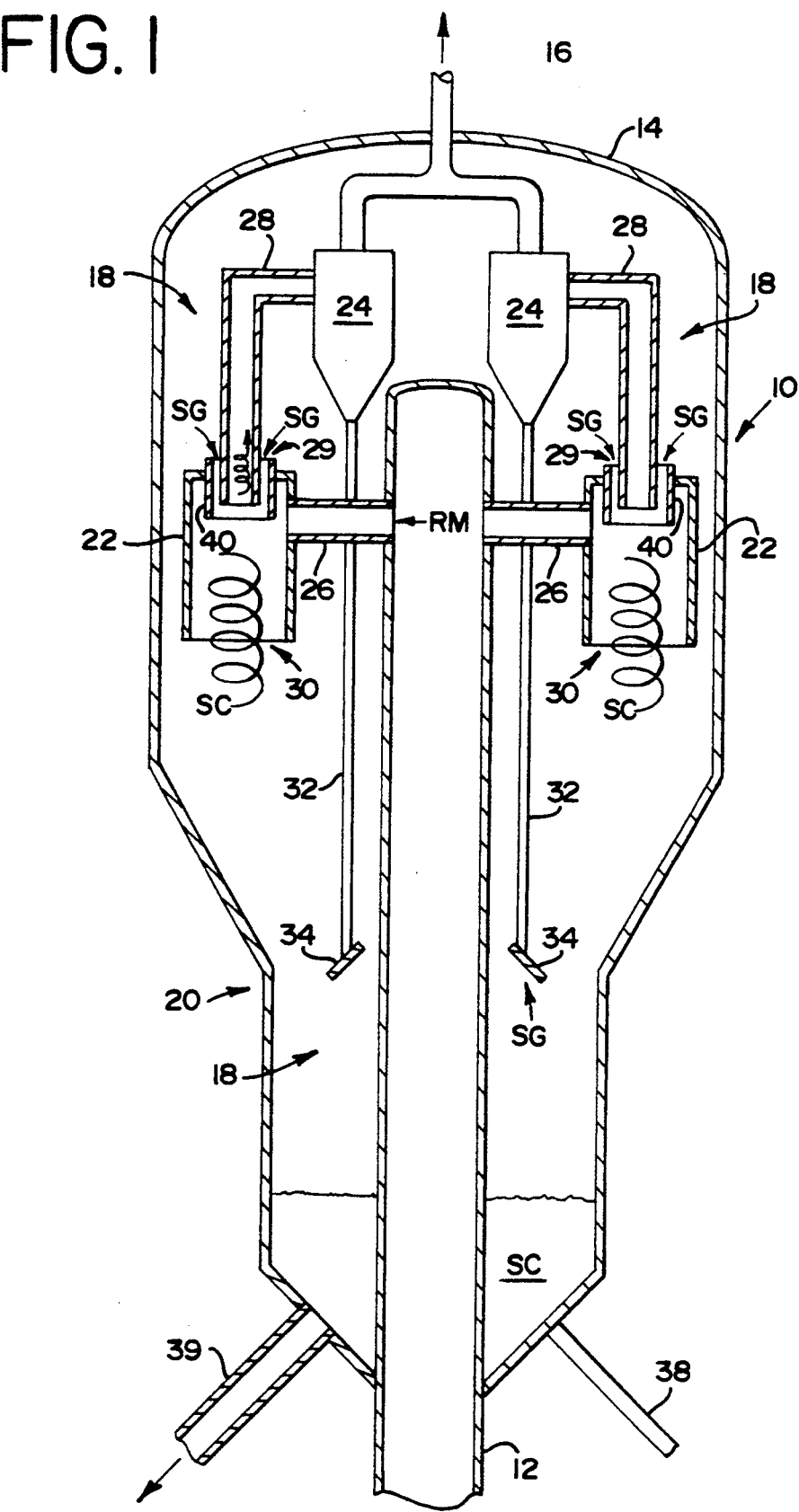
FIG. 1 is a sectional view of a riser reactor and associated disengagement equipment including an open-bottomed cyclone with a gas inlet in accordance with the present invention.

Referring first to FIG. 1, a catalytic cracking reactor 10 includes a riser reactor 12 located generally along the longitudinal centerline of a disengagement vessel 14. During operation, hot catalyst and feedstock is introduced at or near the bottom of reactor 12. The hot catalyst vaporizes the hydrocarbon feedstock and the mixture is propelled upward through reactor 12 as a fluidized bed. The feedstock and catalyst react while rising through reactor 12, being converted to a reaction mixture of predominantly spent catalyst and cracked hydrocarbon vapors by the time these materials reach the upper end of reactor 12.

Vessel 14 has a relatively large diameter upper region 16 containing various catalyst disengagement equipment 18 in accordance with the present invention and a relatively smaller diameter lower portion 20 in which spent catalyst SC accumulates as discussed below. As illustrated, disengagement equipment 18 consists primarily of a pair of open-bottomed cyclones 22, a pair of closed-bottomed secondary cyclones 24, reactor discharge pipes 26 for providing a closed vapor path between reactor 12 and open-bottomed cyclones 24, and open-bottomed cyclone gas outlet pipes 28 including separator finder tube members 29 for providing a closed vapor path between cyclones 22 and cyclones 24.

Following the catalytic cracking process, spent catalyst and cracked hydrocarbon vapors are discharged from reactor 12 through tubes 26 and pass into cyclones 22. Cyclones 22 cyclonically separate solid catalyst from the reaction mixture RM, causing spent catalyst SC to fall through cyclone open bottoms 30 toward lower vessel region 20. Solids-depleted gas from cyclones 22 exits cyclones 22 through gas outlet pipes 28 and enters closed-bottomed cyclones 24 for additional solids separation. Solids separated by cyclones 24 falls into diplegs 32, where the solids accumulate until trickle valves 34 release the accumulated solids into lower vessel region 20. Alternatively, diplegs 32 can be submerged in accumulated spent catalyst SC as is well known in the art. Catalyst-depleted hydrocarbon vapors HV exit cyclones 24 and vessel 14 through vapor outlet header 36 and travel on to a fractionating tower (not shown), where the hydrocarbon vapors are collected by condensation.

Because spent catalyst separated by cyclones 22 and 24 contains a significant quantity of entrained hydrocarbon vapors, stripping steam supplied by a steam line 38 is passed through accumulated spent catalyst SC to strip hydrocarbon vapors from catalyst SC. The steam and stripped hydrocarbon vapors, hereafter collectively referred to as stripping gas SG, passes into upper region 16 of vessel 14. Stripped spent catalyst can be removed through catalyst removal line 39 for regeneration and reuse.

Stripping gas SG discharged into upper vessel region 16 is drawn into open-bottomed cyclones 22 through stripping gas inlet tubes 40. Stripping gas SG mixes with the catalyst-depleted vapors leaving cyclones 22 and is processed through closed-bottomed cyclones 24 and discharged from vessel 14 through header 36.

The operation of open-bottomed cyclone separator 22 is best discussed while viewing FIGS. 2 and 3. Reaction mixture RM is discharged from reactor discharge pipe 26 into a generally cylindrical separation chamber 42. As shown in FIG. 3, the geometry of pipe 26 and chamber 42 is such that mixture RM is tangentially directed at a cylindrical chamber wall member 44. This orientation causes the entering reaction mixture to flow cyclonically within separation chamber 42. As mixture RM flows within chamber 42, the angular momentum of spent catalyst SC within the mixture causes spent catalyst SC to move into a catalyst-rich region CR near chamber wall 44. The catalyst particles continue to spin within chamber 42, occasionally striking wall 44 as they rotate downwardly within chamber 42 and out open cyclone bottom 30.

Hydrocarbon vapors present in reaction mixture RM generally are not subject to the momentum effects that move the relatively heavy catalyst particles into catalyst-rich region CR. As a result, the migration of catalyst towards chamber wall 44 creates a catalyst-depleted central region CD located in an inner radial area of chamber 42. The material present in region CD consists primarily of hydrocarbon vapors and catalyst fines having insufficient momentum to move towards chamber wall member 44. Because hydrocarbon vapors are condensed after they leave reactor 10, a relatively low system pressure is present at the inlet of a finder tube lower member 46 located near the top of chamber 42. The low system pressure causes a catalyst-depleted gas HV to be drawn from catalyst-depleted region CD into lower finder tube member 46, through an upper finder tube member 48 located above separation chamber 42 and into reactor discharge pipe 26.

Stripping gas present outside cyclones 22 is continuously admitted into cyclones 22 during the catalyst disengagement process. Stripping gas inlet tube 40 is coaxially located around lower finder tube member 46 and extends through an otherwise enclosed chamber top member 50. As shown in FIG. 3, inlet tube 40 and lower finder tube member 46 cooperate to form an annular channel 52 through which stripping gas SG can pass from outside chamber 42 downwardly toward catalyst-depleted chamber region CD.

Still referring to FIG. 3, an outer cylindrical surface 54 of tube 40 is circumferentially joined to chamber top 50 (see FIG. 2). A plurality of inlet tube supports 56 are connected between finder tube lower member 46 and an inlet tube inner cylindrical surface 58. The mechanical configuration of supports 56 is noncritical but should not disrupt the flow of stripping gas SG through annular channel 52.

Low system pressure present in lower finder tube member 46 causes stripping gas SG directed through gas inlet tube 40 to be sucked into finder tube member 29 without gas SG passing through catalyst-rich region CR. By directing stripping gas flow in this manner, catalyst from catalyst rich region CR does not become entrained in the entering stripping gas SG.

Preferably, gas inlet tube 40 and lower finder tube member 46 extend into chamber 42 below reactor discharge pipe 26 to prevent introduced reaction mixture RM from being sucked into finder tube member 29 before cyclonic separation occurs. Additionally, it is preferred that gas inlet tube 40 extend below lower finder tube member 46 as shown in FIG. 2 to further minimize the intermixing of stripping gas SG with catalyst rotating in chamber 42. Finally, while it is preferred that inlet tube 40 be coaxially located around finder tube member 46, other embodiments of gas inlet tubes may be used as long as they discharge stripping gas into a solids-depleted region of the chamber and do not significantly disrupt cyclonic flow within the chamber.

Proper operation of stripping gas inlet tube 40 requires that annular channel 52 offer a relatively lower pressure path for stripping gas than does open cyclone bottom 30.

To ensure that this lower pressure path is obtained, the velocity of stripping gas through annular channel 52 should preferably be less than 40 feet per second, and more preferably should be close to 10 feet per second. The width of gap 52 needed to obtain these preferred velocities will depend upon the relative dimensions of cyclone body 44, and vortex finder tube members 46 and 48, the number of cyclones attached to riser 12, and the amount of stripping steam that is being used. For a typical fluidized bed catalytic cracking unit operation, the area of the annular gap 52 will be 10 percent or less of the inside cross-sectional area of wall member 44 to obtain the desired velocities although larger areas up to about 50% of the inside cross-sectional area of wall member 44 can be used.

Figure 5:
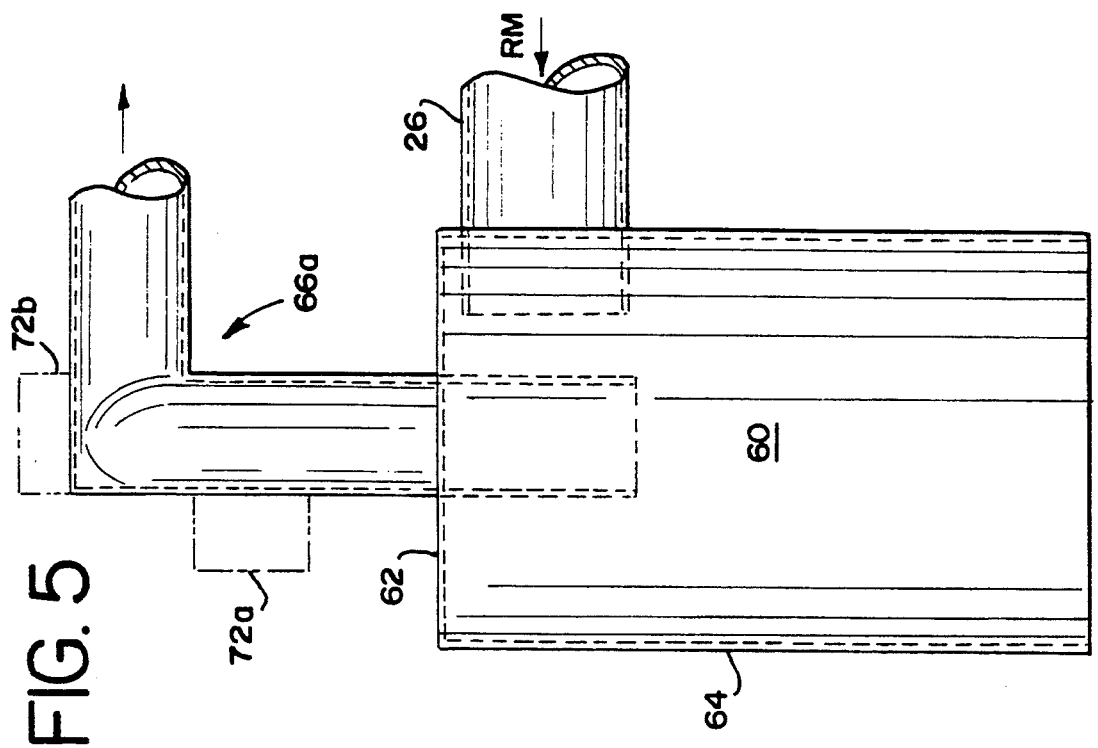
FIGS. 4 and 5 are elevational views of other embodiments of an open-bottomed cyclones in accordance with the present invention.
Figure 4:
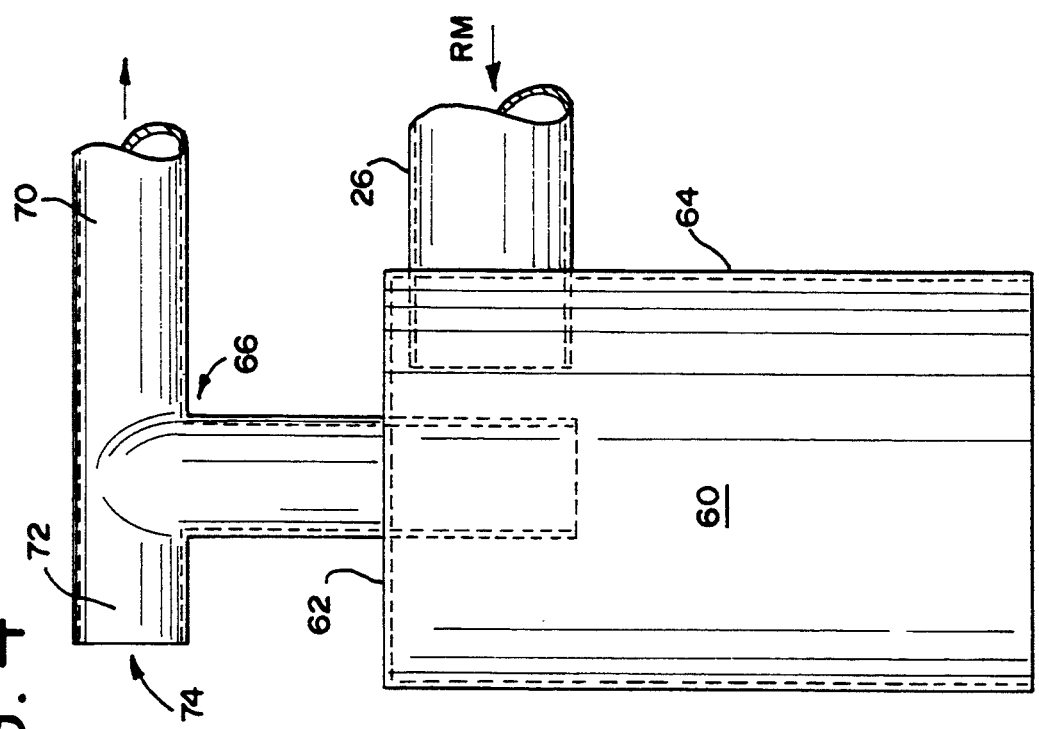

FIGS. 4 and 5 illustrate other embodiments of open-bottomed cyclones employing gas inlet tubes to minimize reentrainment of separated catalyst. In both FIGURES, reactor discharge pipe 26 tangentially injects reaction mixture RM into a separation chamber 60 having a generally closed top member 62 and a cylindrical wall member 64. Reaction mixture RM enters chamber 60 and catalyst is separated as in the embodiment discussed in conjunction with FIGS. 1-3. Unlike the earlier discussed embodiment, however, chamber top member 62 surrounds a finder tube fitted with a gas inlet tube at some point external to separation chamber 60. This permits stripping gas SG to be flow directly into a region of catalyst-depleted gas present in the separator finder tube, thus bypassing the separation chamber entirely.

In FIG. 4, a finder tube 66 has a vertical finder tube portion 68 which concentrically extends into chamber 60. A horizontal finder tube portion 70 extends horizontally from the top of vertical finder tube portion 68 in axial alignment with a gas inlet tube 72 having an open end 74. FIG. 5 shows two similar embodiments in which gas inlet tubes 72a or 72b allow stripping gas to directly enter finder tube 66a at alternate locations. In each case, it is preferred that the cross-sectional area of the gas inlet tube inlet be sufficiently large to conform to the cross-sectional area ratio and/or pressure gradient criteria discussed in conjunction with the embodiment of FIGS. 1-3.

The embodiments of FIGS. 4 and 5 are preferred where a mechanically simple open-bottomed cyclone installation is required. For example, where improved performance of an existing open-bottomed cyclone installation is desired, the embodiments of FIGS. 4 or 5 can be implemented simply by adding the gas inlet tube to preexisting piping directly downstream of the separation chamber.

It should be understood that although the embodiments of FIGS. 1-5 are oriented vertically, the centrifugal forces generated in the separation process typically exceed gravitational forces by several orders of magnitude, thereby permitting the invention to operate successfully in non-vertical orientations. Furthermore, while the embodiments discussed in conjunction with FIGS. 1-5 are particularly useful for separating spent catalytic cracking catalyst from cracked hydrocarbon vapors, the invention is useful in any open-bottomed cyclone installation where a process gas needs to be mixed with a solids-depleted gas created within the cyclone. The invention, therefore, is intended to be limited in scope only by the following claims.

What is claimed is:

1. A method for separating solids from a mixture of solids and gases comprising the steps of:
    introducing the mixture into a radially symmetric open-ended separation chamber tangential to a chamber wall to impart cyclonic motion to the introduced mixture;
    allowing the solids to cyclonically rotate outwardly through a solids-rich chamber region near the chamber wall and out the open chamber end;
    collecting a solids-depleted gas from a solids-depleted central region of the chamber; and
    directing the process gas into a region of solids-depleted gas within the separator and away from a region of solids-rich gas within the separator.

2. The method of claim 1 wherein the mixing step includes directing the process gas into a solids-depleted region within the chamber, 3. The method of claim 1 wherein the collecting step includes withdrawing the solids-depleted gas through a finder tube extending into the solids-depleted region within the chamber and wherein the mixing step includes passing the process gas through a gas inlet tube opening directly into the finder tube, 4. The method of claim 1 wherein the mixing step includes passing the process gas through the gas inlet tube at a velocity less than about 40 feet per second.

5. The method of claim 4 wherein the mixing step includes passing the process gas through the gas inlet tube at about 10 feet per second, 6. A method for separating spent catalyst from a reaction mixture of spent catalyst and hydrocarbon vapors comprising the steps of:
    introducing the mixture into a generally vertical, generally cylindrical open-bottomed separation chamber tangential to a chamber wall to impart cyclonic motion to the introduced mixture;
    allowing the spent catalyst to rotate downwardly through a catalyst-rich region formed along the chamber wall and out the open chamber bottom;
    collecting catalyst-depleted hydrocarbon vapors from a catalyst-depleted central chamber region through a finder tube concentrically extending downwardly into the chamber; and
    directing the stripping gas into a region of catalyst-depleted vapors within the separator and away from a region of catalyst-rich vapors within the separator.

7. The method of claim 6 wherein the mixing step includes directing the stripping gas into the catalyst-depleted central region of the chamber, 8. The method of claim 7 wherein the mixing step includes directing the stripping gas through a gas inlet tube coaxially located around the finder tube.

9. The method of claim 8 wherein the passing step includes passing the stripping gas through an annular channel located between the finder tube and the gas inlet tube at a velocity of about 40 feet per second or less.

10. The method of claim 9 wherein the stripping gas is passed through the gas inlet tube at about 10 feet per second.

11. The method of claim 6 wherein the mixing step includes collecting catalyst-depleted hydrocarbon vapors through a separator finder tube concentrically extending downwardly into the chamber and wherein the passing step includes passing the stripping gas through a gas inlet tube connected to the finder tube above the chamber top member to mix the stripping gas with the catalyst-depleted hydrocarbon vapors withdrawn from the chamber.

12. The method of claim 11 wherein the passing step includes passing the stripping gas through the gas inlet tube at a velocity of about 40 feet per second or less.

13. The method of claim 12 wherein the stripping gas is passed through the inlet tube at a velocity of about 10 feet per second.

14. The method of claim 1 further including the step of isolating the entering process gas from a portion of the solids-rich chamber region by directing the process gas into the region of solids-depleted gas through a generally closed flow path located at least partially within the chamber.

15. The method of claim 6 further including the step of isolating the entering stripping gas from a portion of the catalyst-rich region by directing the stripping gas through a generally closed flow path into the catalyst-depleted region of the chamber.

* * * * *